United States Patent
Ruiz et al.

(10) Patent No.: US 10,952,264 B2
(45) Date of Patent: Mar. 16, 2021

(54) PERSISTENT DISTRIBUTION OF CONNECTIONLESS TRAFFIC SUPPORTING VIRTUAL CONNECTION MIGRATION

(71) Applicant: Verizon Digital Media Services Inc., Dulles, VA (US)

(72) Inventors: Sergio Leonardo Ruiz, Redondo Beach, CA (US); Derek Shiell, Santa Monica, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 76 days.

(21) Appl. No.: 16/298,399

(22) Filed: Mar. 11, 2019

(65) Prior Publication Data

US 2019/0208554 A1  Jul. 4, 2019

Related U.S. Application Data

(63) Continuation-in-part of application No. 15/785,110, filed on Oct. 16, 2017, now Pat. No. 10,476,800.

(51) Int. Cl.
| | |
|---|---|
| *H04W 76/11* | (2018.01) |
| *H04L 29/06* | (2006.01) |
| *G06F 9/455* | (2018.01) |
| *H04W 80/06* | (2009.01) |
| *H04L 29/08* | (2006.01) |
| *H04L 12/46* | (2006.01) |

(52) U.S. Cl.
CPC ......... *H04W 76/11* (2018.02); *G06F 9/45558* (2013.01); *H04L 12/4641* (2013.01); *H04L 67/1002* (2013.01); *H04L 69/08* (2013.01); *H04L 69/161* (2013.01); *H04L 69/164* (2013.01); *H04W 80/06* (2013.01); *G06F 2009/45595* (2013.01)

(58) Field of Classification Search
CPC ... H04W 76/11; H04W 36/14; H04L 67/1002; H04L 12/4641; H04L 67/2814
See application file for complete search history.

(56) References Cited

U.S. PATENT DOCUMENTS

| | | | |
|---|---|---|---|
| 8,601,094 B2 * | 12/2013 | Sargent | H04L 47/193 709/217 |
| 10,193,934 B2 * | 1/2019 | Skuratovich | H04L 65/1006 |
| 2003/0065791 A1 * | 4/2003 | Garg | H04L 63/0281 709/229 |

(Continued)

*Primary Examiner* — Mohammad S Anwar
(74) *Attorney, Agent, or Firm* — Ansari Katiraei LLP; Arman Katiraei; Sadiq Ansari

(57) ABSTRACT

Provided is a device that persistently distributes connectionless traffic across different simultaneously executing server instances in a manner that allows a first set of server instances of the device to commence a new first set of connectionless data streams during a first interval, and a different second set of server instances of the device to commence a different second set of connectionless data streams as the first set of server instances respond to ongoing connectionless data streams of the first set of connectionless data streams during a subsequent second interval. The persistent distribution further supports virtual connection migration by distributing, to the same server instance, data packets that are directed to the same connectionless data stream even when the sending user equipment changes addressing during the connectionless data stream.

19 Claims, 9 Drawing Sheets

(56) References Cited

U.S. PATENT DOCUMENTS

| | | | |
|---|---|---|---|
| 2008/0155103 A1* | 6/2008 | Bailey | G06F 9/544 709/227 |
| 2017/0026448 A1* | 1/2017 | Ravindhran | H04L 69/16 |
| 2017/0093961 A1* | 3/2017 | Pacella | H04L 67/141 |

* cited by examiner

PERSISTENT DISTRIBUTION OF CONNECTIONLESS TRAFFIC SUPPORTING VIRTUAL CONNECTION MIGRATION

This application is a continuation-in-part of U.S. nonprovisional application Ser. No. 15/785,110, entitled "Load Balancing of Connectionless Traffic", filed Oct. 16, 2017. The contents of application Ser. No. 15/785,110 are hereby incorporated by reference.

BACKGROUND ART

The Transmission Control Protocol ("TCP") is a networking protocol for reliable transfer of data packets over a digital network (e.g., the Internet). TCP trades off performance for reliability. The tradeoff is due in part to the overhead for establishing connections between messaging endpoints, and various legacy flow control mechanisms initially conceived for high latency, low bandwidth, and unreliable network links. For instance, a three-way handshake is conducted to establish a connection between TCP messaging endpoints, then a slow start mechanism is used to restrict the initial rate at which data packets are passed over the established connection.

The User Datagram Protocol ("UDP") is a different networking protocol that trades off reliability for performance. UDP removes much of the TCP overhead associated with reliable transport to maximize transfer rates. UDP is commonly used for time-sensitive applications including video streaming, audio streaming, and gaming as some examples.

Quick Internet UDP Connections (QUIC) is a connectionless protocol developed to preserve the performance advantages of UDP and the reliability of TCP. Generally, QUIC transmits data packets using UDP with client-side and server-side adaptations of various TCP reliability features including acknowledgement of received packets.

QUIC is, however, poorly suited for implementation in a multi-server environment. In such environments, a device (e.g., load balancer) or process may distribute data packets across two or more servers. The device or process may provide a persistent distribution so that data packets related to a common session, flow, or stream are distributed to the same server and not different servers. The persistent distribution is simplified in TCP as packets of an ongoing communication relate to the same established connection (e.g., a unique combination of one or more of the source address, source port, destination address, and destination port).

QUIC, like UDP, is connectionless. Accordingly, no connections are established with which to track data packets that are part of the same ongoing communication. Without connection state, a first packet from a client directed to an ongoing communication may be passed to a first server, while a subsequent second packet from the client directed to the same ongoing communication may be passed to a second server.

DETAILED DESCRIPTION

The following detailed description refers to the accompanying drawings. The same reference numbers in different drawings may identify the same or similar elements.

Systems and/or methods, as described herein, may provide a device that persistently distributes connectionless traffic, including data packets of a set of connectionless data streams, across different simultaneously executing server instances. In some embodiments, the persistent distribution provided by the device may allow different sets of single-threaded server instances to concurrently run on the same physical machine as the device, on a different physical machine than the device, or on multiple different machines. Moreover, the persistent distribution may allow a first set of server instances of the device to commence a new first set of connectionless data streams during a first interval, and a different second set of server instances of the device to commence a different second set of connectionless data streams as the first set of server instances respond to ongoing connectionless data streams of the first set of connectionless data streams during a subsequent second interval. In particular, the persistent distribution may ensure that the data packets for a particular connectionless data stream are distributed to the same server instance that commenced that particular connectionless data stream. The device may also support virtual connection migration to preserve the persistent distribution of the connectionless traffic as a particular user equipment ("UE"), that initiates the particular connectionless data stream, changes addressing while the particular connectionless data stream is ongoing.

The device may provide persistent distribution of User Data Protocol ("UDP") connectionless traffic, Quick UDP Internet Connections ("QUIC") connectionless traffic, and/or data packets of other connectionless networking protocols. The persistent distribution may include routing, forwarding, passing, or otherwise directing the data packets (e.g., user requests, acknowledgements, data, etc.) of each particular connectionless data stream to a server instance that is selected from a set of concurrently executing server instances for that particular connectionless data stream.

Figure 1:
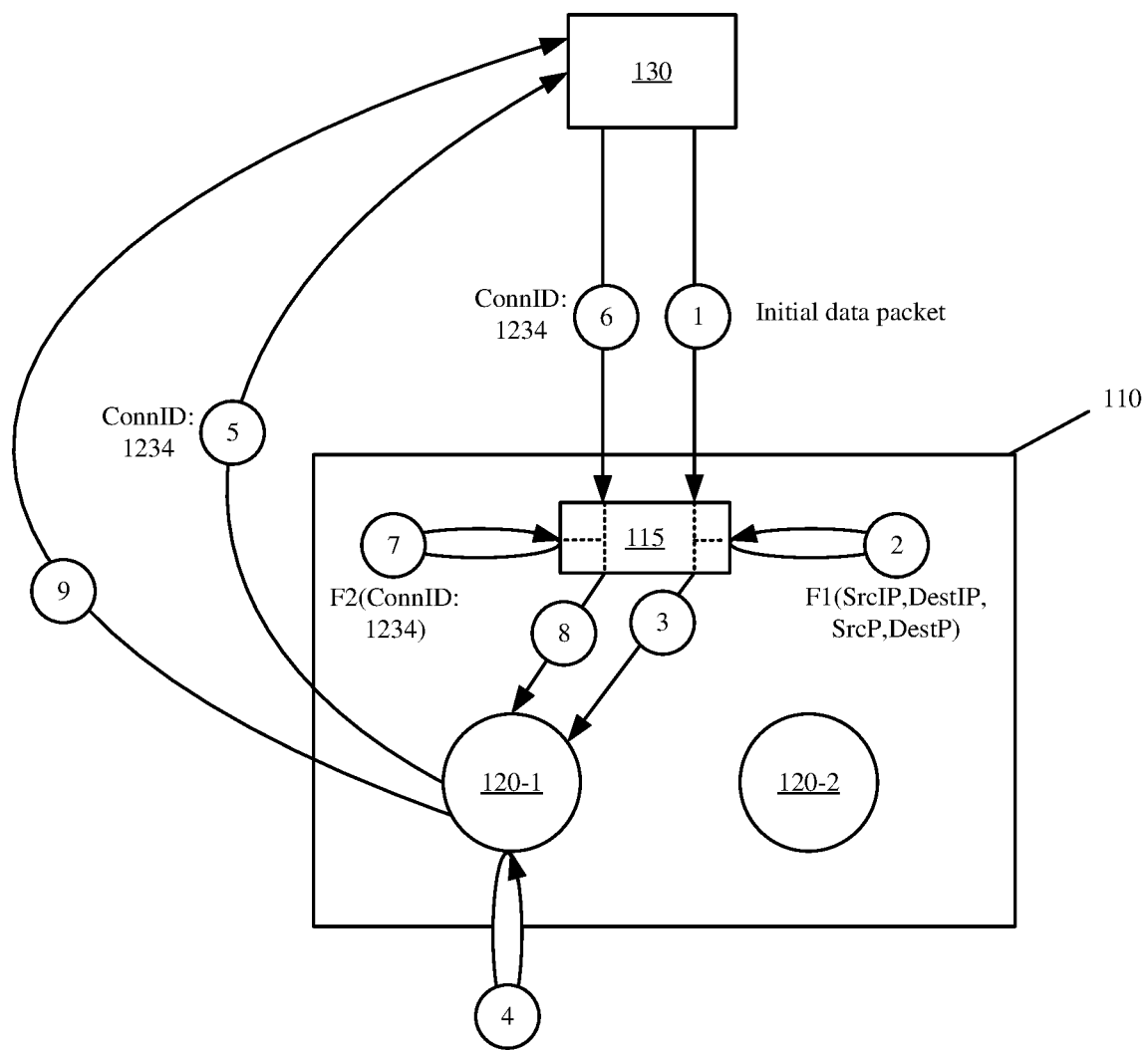
FIG. 1 illustrates an example of the persistent distribution of connectionless traffic in accordance with some embodiments described herein.

FIG. 1 illustrates an example of the persistent distribution of connectionless traffic in accordance with some embodiments described herein. FIG. 1 includes device 110 and UE 130. Device 110 may include distributor 115 and server instances 120-1 and 120-2 (herein sometimes collectively referred to as "server instances 120" or individually as "server instance 120").

In some embodiments, device 110 may represent a single machine with distributor 115 and server instances 120 executing as different processes, threads, and/or applications of the machine. For instance, distributor 115 may be a kernel, operating system, or other process that can filter or otherwise distribute data packets to server instances 120 from a network protocol stack of device 110. In some other embodiments, device 110 may represent multiple physical machines. For instance, distributor 115 may include a load balancing appliance that operates separate from one or more machines executing server instances 120.

Although not shown, device 110 may be scaled with additional distributors 115 and/or server instances 120. In some embodiments, two or more devices 110 may operate in the same point-of-presence ("PoP"). In some such embodiments, a load balancing appliance or director may receive the data packets addressed to the PoP, and the load balancing appliance may provide a persistent distribution of the data packets to devices 110 operating in the same PoP. Each device 110 may provide a persistent distribution of the subset of data packets, received via distributor 115, to server instances 120 of that device 110.

As shown in FIG. 1, UE 130 may issue (at 1) a data packet to device 110. The data packet may be sent to a network address of device 110 without UE 130 having established a network connection to device 110. The data packet and other data packets of the same connectionless protocol, that are addressed to device 110, may be received by distributor 115.

Distributor 115 may determine (at 2) that the data packet is an initial data packet for a new connectionless data stream. Distributor 115 may determine (at 2) that the data packet is an initial packet for a new connectionless data stream based on one or more header and/or payload properties of the data packet. For instance, the initial data packet may use long headers with a predefined type value (e.g., 0x0 or 0x7F), may carry a first cryptographic handshake message sent by UE 130, may include a randomized packet number or specific packet number (e.g., 0), may include a randomized destination connection identifier of a particular size, may include a payload that is padded to a specific size, and/or may have other properties by which to identify the data packet as an initial data packet for a new connectionless data stream.

In response to the initial data packet, distributor 115 may select server instance 120-1 to process the initial data packet, and may distribute (at 3) the initial data packet to selected server instance 120-1. Distributor 115 may select server instance 120-1 using a first distribution scheme. For instance, distributor 115 may use a scheme that selects server instance 120-1 based on one or more of the source address, destination address, source port, and destination port that may be specified as part of the initial data packet header. More specifically, distributor 115 may hash one or more of the source address, destination address, source port, and destination port, and perform a modulo operation of the hash result based on the number of available server instances 120 (e.g., 2 in FIG. 1). The first distribution scheme may account for other header and/or payload properties of the initial data packet in determining where to distribute (at 3) the initial data packet. For instance, the first distribution scheme may also account for the Uniform Resource Locator ("URL") as part of the server instance 120 selection. In some embodiments, distributor 115 may use a different distribution scheme, such as a round-robin distribution, to distribute (at 3) the initial data packet and other initial data packets for new connectionless data streams across server instances 120.

As will be described below, distributor 115 may use a second persistent distribution scheme to distribute subsequent data packets for the same connectionless data stream to server instance 120-1. For instance, the second persistent distribution scheme may be based on a virtual connection identifier that server instance 120-1 generates (at 4) to identify the connectionless data stream in response to receiving the initial data packet. In particular, server instance 120-1 may generate (at 4) a first virtual connection identifier to uniquely identify the first connectionless data stream being created between server instance 120-1 and UE 130, and may select a value for the first virtual connection identifier that causes distributor 115, via execution of the second persistent distribution scheme, to distribute data packets with that first virtual connection identifier to server instance 120-1. For instance, the second persistent distribution scheme may hash the first virtual connection identifier, and may perform a modulo operation of the hash result based on the number of available server instances 120 (e.g., 2) to select server instance 120-1.

In some embodiments, server instance 120-1 may generate (at 4) the first virtual connection identifier and other virtual connection identifiers to be within a first set of virtual connection identifiers for connectionless data streams that are handled by server instance 120-1, and server instance 120-2 may generate virtual connection identifiers to be within a different second set of virtual connection identifiers for connectionless data streams that are handled by server instance 120-2. Distributor 115, by operation of the second persistent distribution scheme, may then select server instance 120-1 for any data packet with a destination connection identifier that is set to one of the first set of virtual connection identifiers, and may select server instance 120-2 for any data packet with a destination connection identifier that is set to one of the second set of virtual connection identifiers. In other words, the second persistent distribution scheme may be configured to select server instance 120-1 for data packets having one of the first set of virtual connection identifiers set in the destination connection identifier header property, and to select server instance 120-2 for data packets having one of the second set of virtual connection identifiers set in the destination connection identifier header property.

Server instance 120-1 may provide (at 5) a response data packet to UE 130 that includes the first virtual connection identifier as the source connection identifier, and a second connection identifier, that is generated by UE 130 and that was included in the initial data packet, as the destination connection identifier. Subsequent data packets from UE 130, that are directed to this first connectionless data stream, may swap the source and destination virtual connection identifiers from the response data packet sent (at 5) by server instance 120-1. For instance, UE 130 may send (at 6) a subsequent data packet to device 110. The subsequent data packet may have the destination connection identifier header property set to the first virtual connection identifier that was generated by server instance 120-1 and that was included in the response data packet from server instance 120-1.

Distributor 115 may receive the subsequent data packet sent (at 6) by UE 130. Distributor 115 may use the second persistent distribution scheme to determine (at 7) that the subsequent data packet is for a connectionless data stream that is handled by server instance 120-1, and to distribute (at 8) the subsequent data packet to server instance 120-1. For instance, distributor 115 may determine (at 7) that the subsequent data packet is not an initial data packet for a new connectionless data stream based on the header and/or payload properties of the subsequent data packet. In response to determining that the subsequent data packet is not an initial data packet, distributor 115 may use the second persistent distribution scheme, instead of the first distribution scheme, to identify the server instance (i.e., server instance 120-1) that previously received and handled data packets for the same connectionless data stream. Distributor 115 may hash the destination connection identifier (e.g., the first virtual connection identifier in the subsequent data packet header) to select server instance 120-1, and to distribute (at 8) the subsequent data packet to server instance 120-1.

Server instance 120-1 may determine that the subsequent data packet is directed to an ongoing connectionless data stream that is handled by server instance 120-1. The determination may be based on server instance 120-1 matching the destination connection identifier from the subsequent data packet header to the first virtual connection identifier that server instance 120-1 previously generated for the first virtual connection identifier. Server instance 120-1 may then process the subsequent data packet, and may provide (at 9) a response. The response may include providing content, service, processing, and/or data to UE 130.

Figure 2:
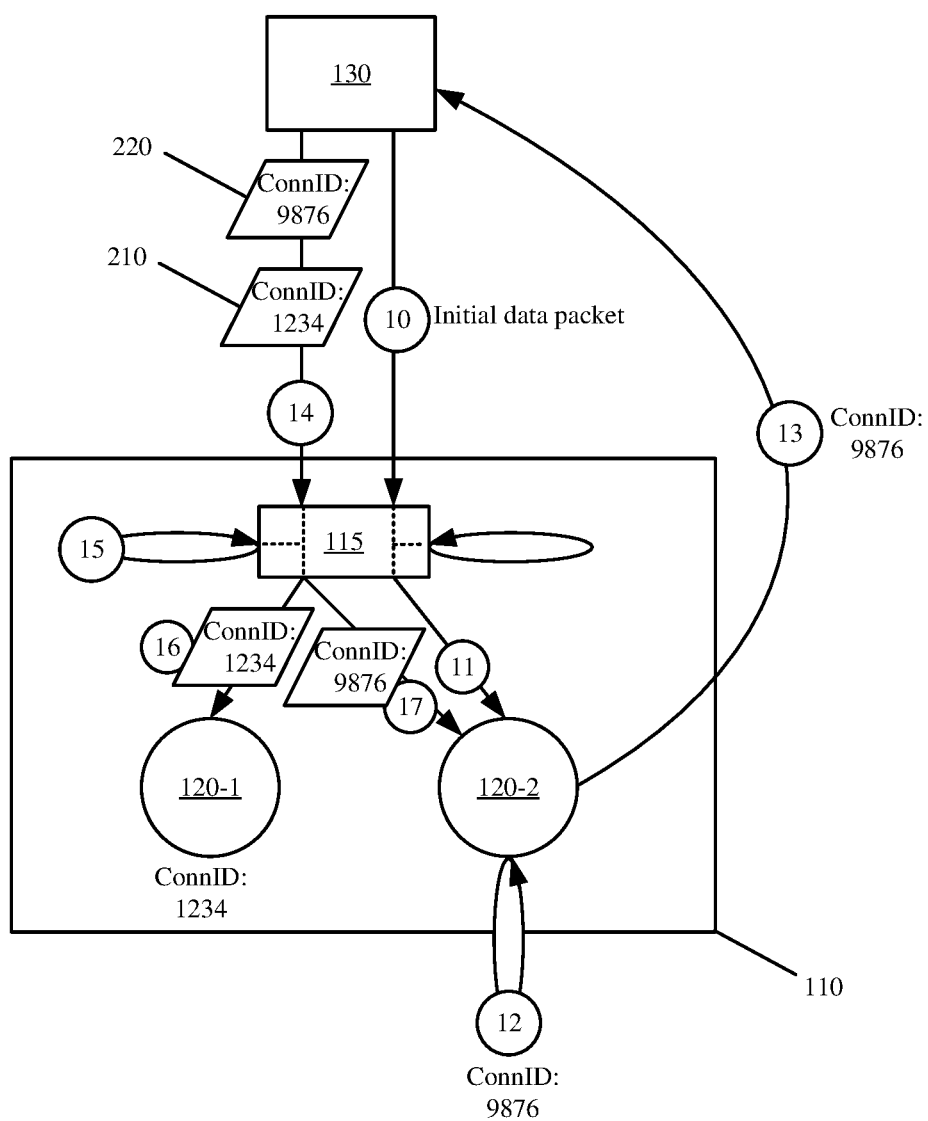
FIG. 2 conceptually illustrates a device providing persistent distribution of connectionless traffic to allow two server instances to concurrently respond to and serve different connectionless data streams in accordance with some embodiments described herein.

FIG. 2 conceptually illustrates device 110 providing persistent distribution of connectionless traffic to allow server instances 120-1 and 120-2 to concurrently respond to and serve different connectionless data streams in accordance with some embodiments described herein. More specifically, FIG. 2 illustrates server instance 120-1 maintaining the first connectionless data stream with UE 130 while distributor 115 distributes a second connectionless data stream requested by UE 130 to server instance 120-2. In FIG. 2, UE 130 may represent a single user or device, or may, alternatively, represent two users or devices.

FIG. 2 continues from FIG. 1 and illustrates UE 130 sending (at 10) an initial data packet for the second connectionless data stream. Distributor 115 may receive (at 10) the initial data packet for the second connectionless data stream, and may distribute (at 11) the initial data packet to server instance 120-2 based on a distribution decision obtained using the first distribution scheme. The first distribution scheme may be based on a round-robin distribution scheme such that the initial data packet for the first connectionless data stream is distributed to server instance 120-1 as shown in FIG. 1, and the initial data packet for the second connectionless data stream is distributed to server instance 120-2 as shown in FIG. 2. The first distribution scheme may alternatively use header and/or payload properties of the initial data packets (e.g., addressing tuples) to select which server instance 120 is to receive that initial data packet.

Server instance 120-2 may determine (at 12) that the initial data packet is for a new connectionless data stream based on one or more header and/or payload properties of the initial data packet, and may generate (at 12) a second virtual connection identifier to uniquely identify the second connectionless data stream being created between server instance 120-2 and UE 130. In particular, server instance 120-2 may generate the second virtual connection identifier to be within the second set of virtual connection identifiers, wherein the second set of virtual connection identifiers are configured in the second persistent distribution scheme used by distributor 115 to identify connectionless data streams handled by server instance 120-2. Accordingly, distributor 115, by operation of the second persistent distribution scheme, may distribute data packets from UE 130, that are not initial data packets and that include one of the second set of virtual connection identifiers as the destination connection identifier, to server instance 120-2. Server instance 120-2 may provide (at 13) a response data packet with the second virtual connection identifier to UE 130.

Device 110 may receive (at 14) additional data packets 210 and 220 from UE 130, and may provide data packets 210 and 220 to distributor 115. Distributor 115 may determine (at 15) that data packets 210 and 220 are not initial data packets based on the header and/or payload properties of data packets 210 and 220. Accordingly, distributor 115 may use the second persistent distribution scheme and the destination connection identifier from each data packet 210 and 220 to persistently distribute data packets 210 and 220.

Data packet 210 may include the first virtual connection identifier, that is generated by server instance 120-1 for the first connectionless data stream, as the destination connection identifier. Consequently, distributor 115 may hash the first virtual connection identifier, and may distribute (at 16) packet 210 to server instance 120-1 that commenced the first connectionless data stream with UE 130 such that the first connectionless data stream continues with server instance 120-1 without interruption or interference by other server instances (e.g., server instance 120-1 can receive and respond to all data packets that are directed to the first connectionless data stream).

Data packet 220 may include the second virtual connection identifier, that is generated by server instance 120-2 for the second connectionless data stream, as the destination connection identifier. Consequently, distributor 115 may hash the second virtual connection identifier, and may distribute (at 17) packet 220 to server instance 120-2 that commenced the second connectionless data stream with UE 130 such that the second connectionless data stream continues with server instance 120-2 without interruption or interference by other server instances (e.g., server instance 120-2 can receive and respond to all data packets that are directed to the second connectionless data stream).

Each server instance 120 can determine which connectionless data streams are implicated by data packets 210 and 220 based on the destination connection identifier in the packets, and can provide the proper response. For instance, UE 130 may receive first video stream (e.g., a first connectionless data stream) from server instance 120-1, while simultaneously receiving second content (e.g., a second connectionless data stream) from server instance 120-2.

Since the distribution of the connectionless traffic is based on the virtual connection identifiers, UE 130 may move between different networks, may be assigned new addressing as a result of moving between different network, and may continue each of the connectionless data streams without interruption despite the addressing of UE 130 changing as a result of the migration and/or other reasons.

Figure 3:
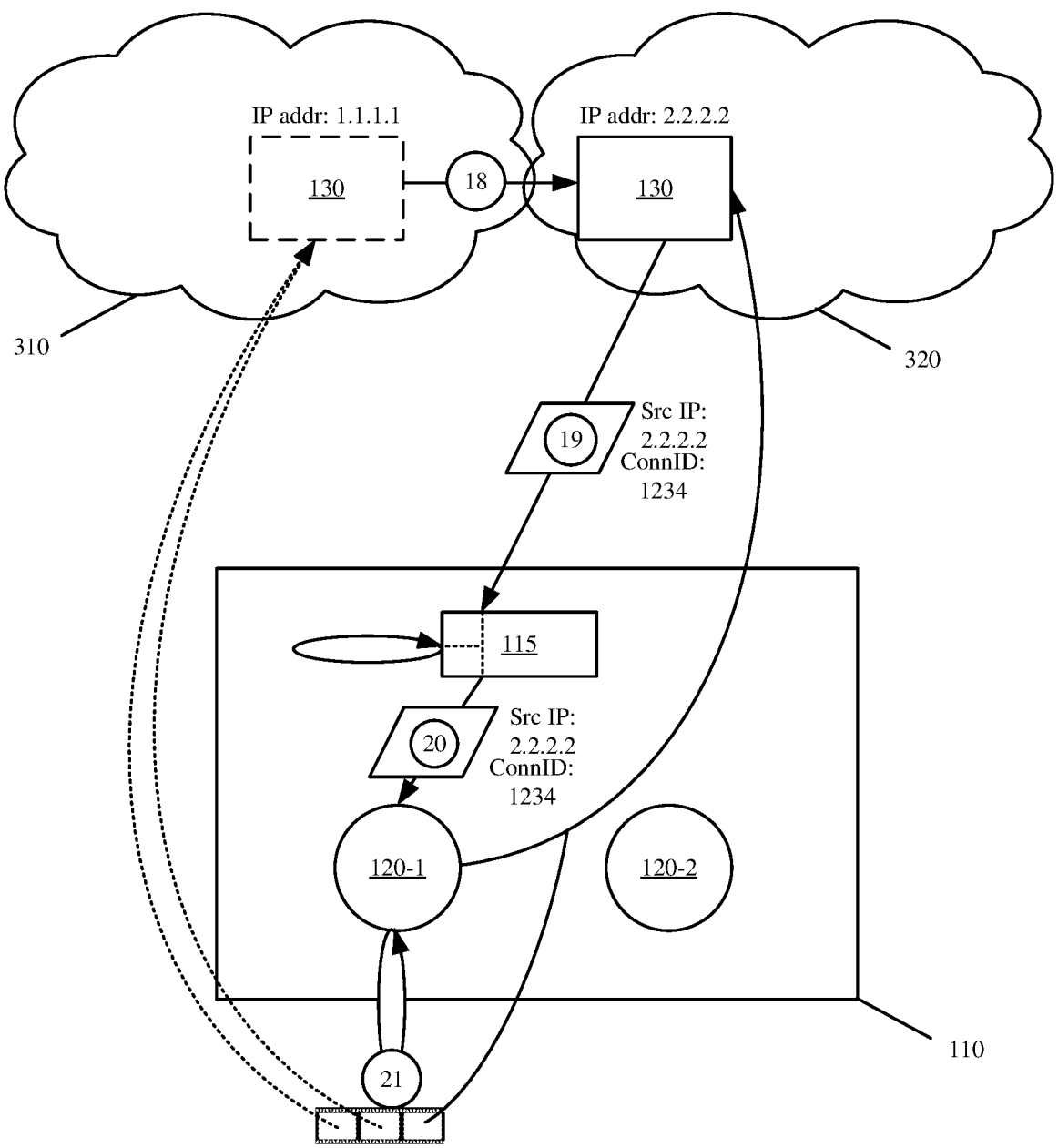
FIG. 3 illustrates an example of user equipment ("UE") migrating to a different network, and continuing an existing connectionless data stream with different addressing in accordance with some embodiments described herein.

FIG. 3 illustrates an example of UE 130 migrating to a different network, and continuing the first connectionless data stream with different addressing in accordance with some embodiments described herein. As shown, UE 130 may move (at 18), be handed-off, or otherwise migrate from first network 310 to second network 320, and may be assigned a new Internet Protocol ("IP") address as a result. However, UE 130 continues sending (at 19) data packets for the same first connectionless data stream (e.g., requesting additional segments of a video) to server instance 120-1 by addressing the data packets to the same destination address and/or port of device 110, and by setting destination connection identifier to the same first virtual connection identifier that was selected for the first connectionless data stream by server instance 120-1.

Distributor 115 may receive the data packets from the new source address of UE 130. Distributor 115 may distribute (at 20) the data packets to server instance 120-1 based on a hash of the destination connection identifier in the header or payload of the data packets. Server instance 120-1 may receive the data packets, and may determine (at 21) that the data packets, despite the changed source IP addressing for UE 130, are part of the first connectionless data stream that is ongoing with UE 130. The determination (at 21) may be based on a hash of the destination connection identifier in the header or payload of the data packets. Consequently, server instance 120-1 may continue providing (at 22) the content, service, processing, and/or data for the first connectionless data stream to UE 130. For instance, server instance 120-1 may continue communications with UE 130 by swapping the source and destination connection identifiers from the data packets sent by UE 130, and by addressing response data packets to the changed addressing that is present in the data packets sent by UE 130 while UE 130 operates from second network 320 instead of first network 310.

In some embodiments, server instances 120 may be periodically restarted. Server instances 120 may restart at various times (e.g., every ten minutes, every hour, etc.) or in response to different events (e.g., serving a certain number of flows or virtual connections). Server instances 120 may restart for reliability, resource management, performance, and/or other reasons.

Restarting a server instance 120 may include preventing an existing server instance from receiving initial data packets for new connectionless data streams, initiating a new server instance to accept the initial data packets for new connectionless data streams, and continuing execution of the existing server instance until existing connectionless data streams handled by that server instance are drained, completed, and/or terminated. An existing connectionless data stream may be one that the server instance received an initial data packet for, generated a virtual connection identifier for, retains state of, and/or provided content, service, processing, and/or data to. Once all connectionless data streams handled by an existing server instance have been drained, completed, and/or terminated, that server instance may shutdown and/or terminate, thereby releasing the allocated resources back to device 110. In this manner, device 110 can provide reliable parallel operation by ensuring that no single server instance 120 or single connectionless data stream handled by a particular server instance 120 degrades performance and/or operation of other server instances 120 running on device 110.

Figure 4:
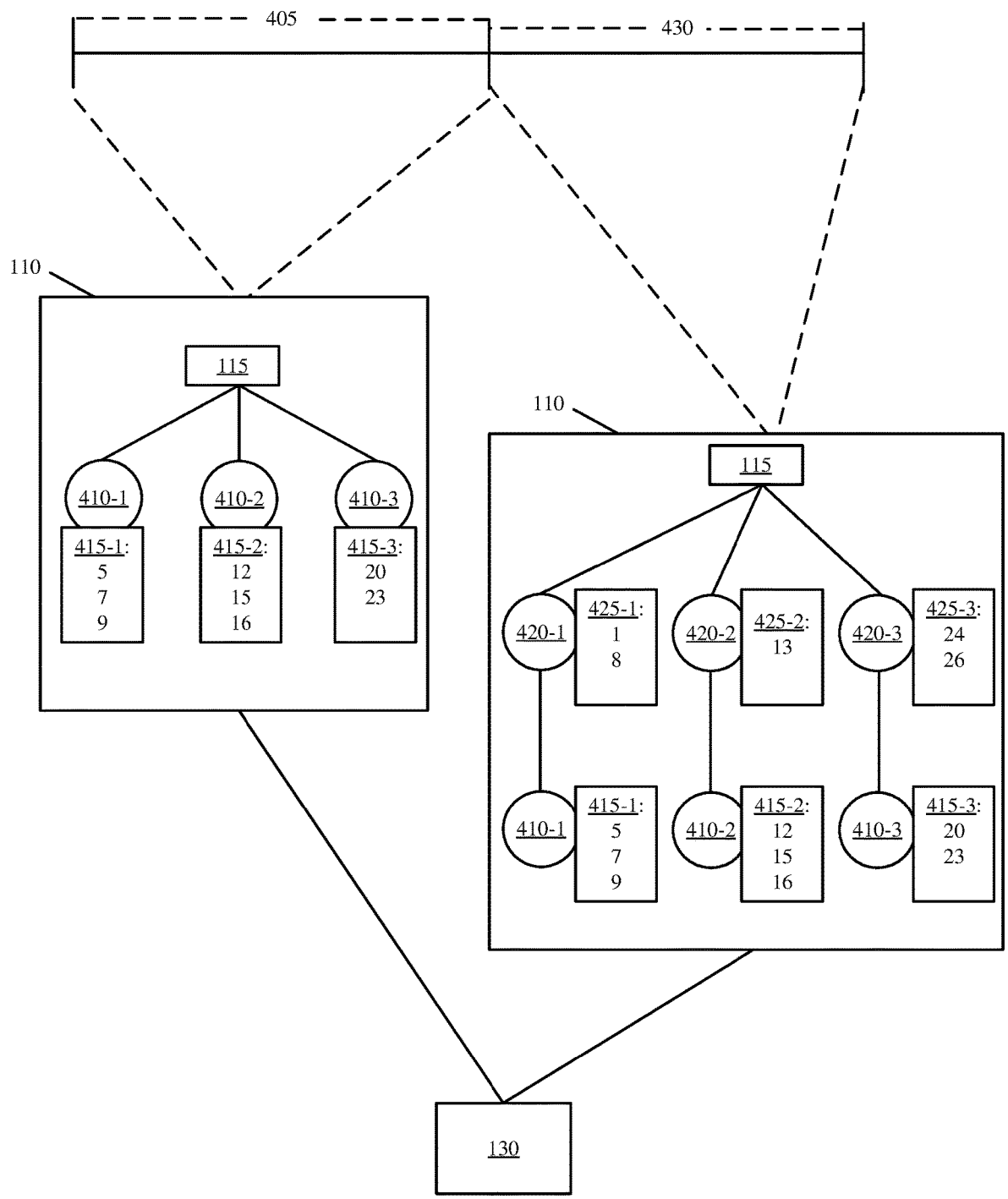
FIG. 4 illustrates example operation of different sets of server instances executing on the device over time in accordance with some embodiments described herein.

FIG. 4 illustrates example operation of different sets of server instances executing on device 110 over time in accordance with some embodiments described herein. As shown in FIG. 4, during first time 405, device 110 executes with distributor 115 and a first set of server instances 410-1, 410-2, and 410-3 (herein sometimes collectively referred to as "first set of server instances 410"). During first time 405, the first set of server instances 410 may receive initial data packets for a first set of connectionless data streams, may generate virtual connection identifiers 415-1, 415-2, and 415-3 (herein sometimes collectively referred to as "virtual connection identifiers 415") to identify each of the first set of connectionless data streams, and/or may provide different content, services, processing, and/or data to UEs 130 that initiated each of the first set of connectionless data streams.

At the end of first time 405, device 110 may restart the server instances. In some embodiments, restarting the server instances may include initiating new second set of server instances 420-1, 420-2, and 420-3 (herein sometimes collectively referred to as "second set of server instances 420") to receive initial data packets for new connectionless data streams instead of first set of server instances 410. Restarting the server instances may further include linking each existing server instance 410-1, 410-2, and 410-3 from first set of server instances 410 to a corresponding server instance 420-1, 420-2, and 420-3 of second set of server instances 420.

The one-to-one correspondence and link between server instances 410-1 and 420-1, server instances 410-2 and 420-2, and server instance 410-3 and 420-3 preserves the ability of distributor 115 to persistently distribute data packets for new and old connectionless data streams to the server instance that handles that connectionless data stream. For instance, during second time 430, that immediately follows first time 405, distributor 115 may distribute the initial data packets for a new second set of connectionless data streams across second set of server instances 420. In response, second set of server instances 420 may generate virtual connection identifiers 425-1, 425-2, and 425-3 (herein sometimes collectively referred to as "virtual connection identifiers 425") to identify the second set of connectionless data streams, and may respond to the second of set of connectionless data streams. Distributor 115 may also persistently distribute data packets for the previous first set of connectionless data streams to first set of server instances 410 via a corresponding and/or linked server instance from the second set of server instances 420.

Figure 5:
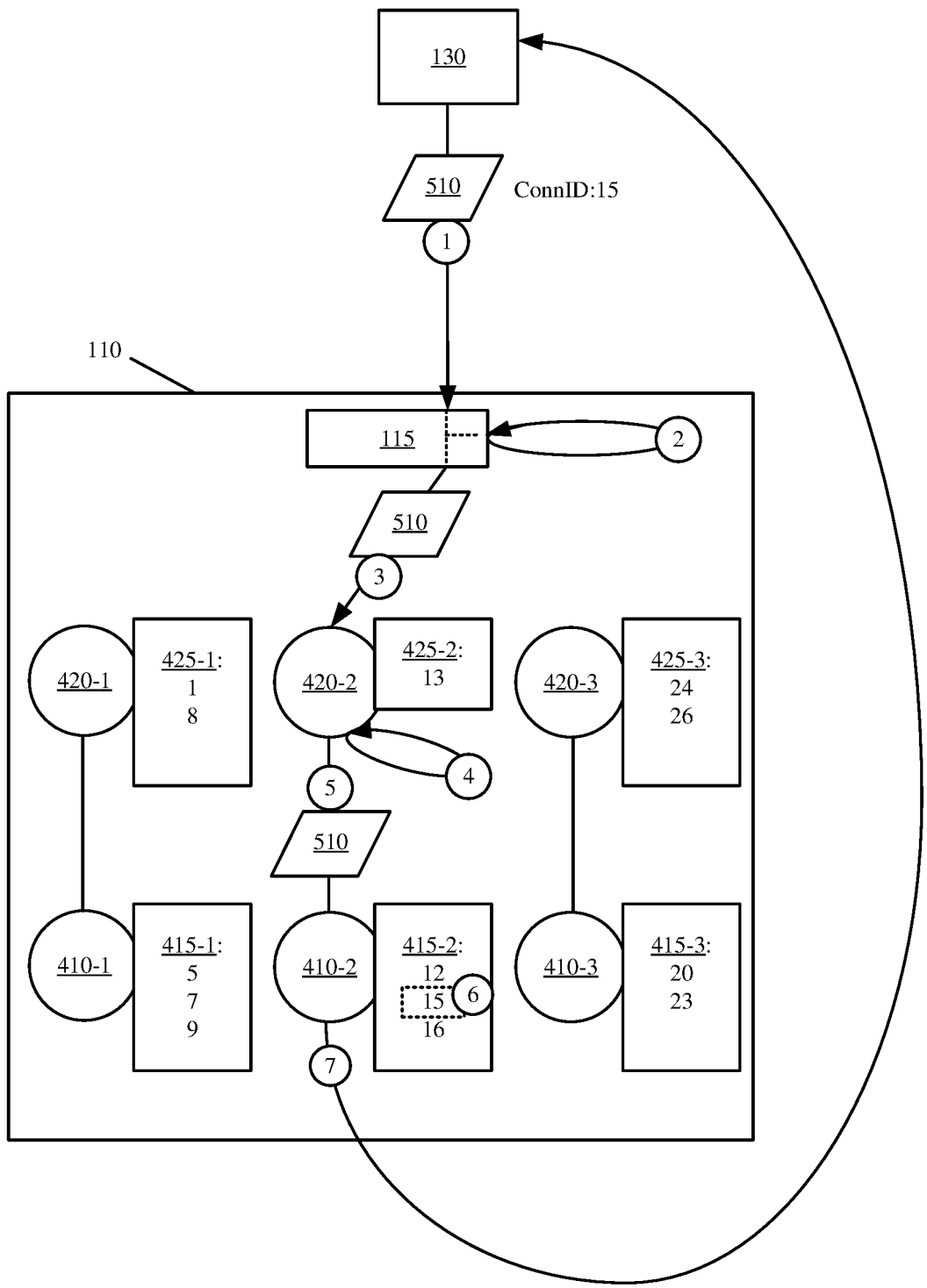
FIG. 5 illustrates an example for persistently distributing a data packet that is directed to a previous set of connectionless data streams in accordance with some embodiments described herein.

FIG. 5 illustrates an example for persistently distributing a data packet that is directed to the previous first set of connectionless data streams handled by first set of server instances 410 at second time 430 in accordance with some embodiments described herein. As shown in FIG. 5, distributor 115 may receive (at 1) data packet 510 with a first virtual connection identifier set as the destination connection identifier. Distributor 115 may determine (at 2) that data packet 510 is not an initial data packet for a new connectionless data stream based on the header and/or payload properties of data packet 510. Based on the determination (at 2) that data packet 510 is not an initial data packet, distributor 115 may use the second persistent distribution scheme to hash the first virtual connection identifier, select server instance 420-2 based on the hash result, and/or distribute (at 3) data packet 510 to server instance 420-2.

Server instance 420-2 may receive (at 3) data packet 510, may determine (at 4) data packet 510 is not an initial data packet for a new connectionless data stream, and may further determine (at 4) that the first virtual connection identifier of data packet 510 is different than each of virtual connection identifiers 425-2 generated by server instance 420-2 for the connectionless data streams initiated and/or handled by server instance 420-2. Accordingly, server instance 420-2 may forward and/or transfer (at 5) data packet 510 to linked server instance 410-2.

Server instance 410-2 may receive data packet 510 from server instance 420-2. Server instance 410-2 may determine (at 6) that the first virtual connection identifier of data packet 510 is for a connectionless data stream that is handled by server instance 410-2 based on the first virtual connection identifier from data packet 510 matching to one of virtual connection identifiers 415-2 generated by server instance 410-2 for the connectionless data streams initiated by and/or handled by server instance 410-2. Accordingly, server instance 410-2 may process and/or provide (at 7) a response to UE 130. Once server instance 410-2 has drained, completed, and/or terminated each of the connectionless data streams identified by virtual connection identifiers 415-2, server instance 410-2 may shutdown, and remove itself from device 110.

Although not shown in FIG. 5, distributor 115 may receive a second data packet with a second virtual connection identifier, and may distribute the second data packet to server instance 420-2 based on the second data packet not being an initial data packet for a new connectionless data stream, and further based on a hash of the second virtual connection identifier. Server instance 420-2 may determine that the second virtual connection identifier identifies a connectionless data stream that is handled by server instance 420-2. Accordingly, server instance 420-2 may process and/or directly respond to the second data packet without forwarding the second data packet to server instance 410-2.

The number of linked server instances can increase depending on the restart frequency and/or length of time it takes to drain, complete, and/or terminate an existing connectionless data stream. For instance, device 110 in FIG. 4 may continue operating to a third time, after second time 430, such that a third set of server instances are created to receive initial data packets for a third set of connectionless data streams. The third set of server instances may link to second set of server instances 420, and second set of server instances 420 may link to remaining server instances from first set of server instances 410.

Figure 6:
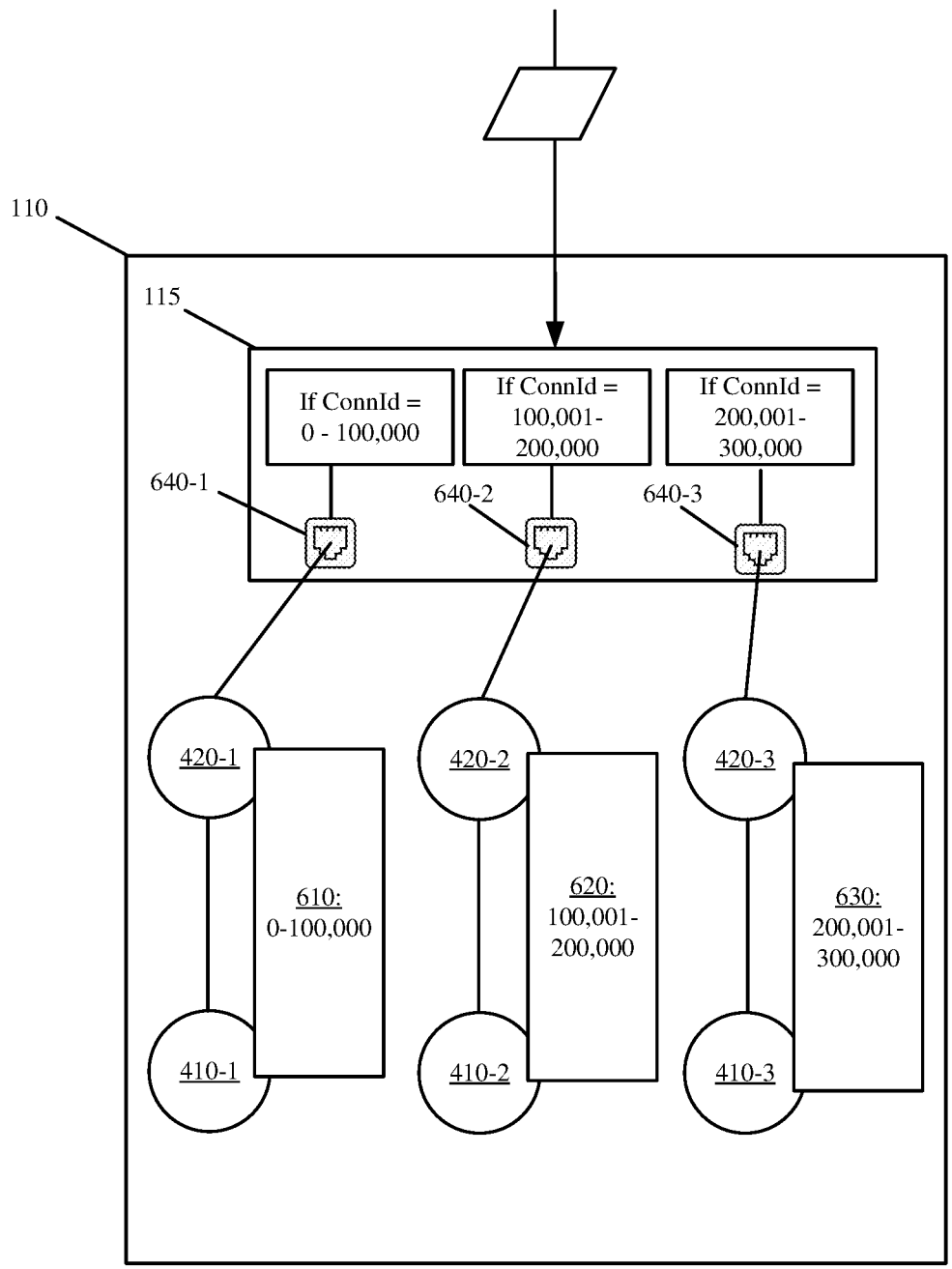
FIG. 6 conceptually illustrates the persistent distribution performed by the device scaling in response to more than one set of server instances that are concurrently running on the device in accordance with some embodiments described herein.

Regardless of the number of concurrently running server instances, device 110 retains the persistent distribution of connectionless traffic. FIG. 6 conceptually illustrates the persistent distribution performed by device 110 scaling in response to more than one set of server instances that are concurrently running on device 110 in accordance with some embodiments described herein.

FIG. 6 illustrates device 110 with distributor 115, second set of server instances 420 that directly receive data packets from distributor 115, and first set of server instances 410, each of which is linked to a corresponding server instance from second set of server instances 420. FIG. 6 further illustrates the different subsets of virtual connection identifiers that each server instance may assign to identify a connectionless data stream. For instance, server instance 420-1 and server instance 410-1, that is linked to server instance 420-1, may assign virtual connection identifiers 610 in the range of 0-100,000; server instance 420-2 and server instance 410-2, that is linked to server instance 420-2, may assign virtual connection identifiers 620 in the range of 100,001-200,000; and server instance 420-3 and server instance 410-3, that is linked to server instance 420-3, may assign virtual connection identifiers 630 in the range of 200,001-300,000. In some embodiments, virtual connection identifiers 610, 620, and 630 may be exclusive and non-overlapping.

The second persistent scheme used by distributor 115 may also be configured to distribute data packets with a destination connection identifier in the range of 0-100,000 to first network socket 640-1, to distribute data packets with a destination connection identifier in the range of 100,001-200,000 to different second network socket 640-2, and to distribute data packets with a destination connection identifier in the range of 200,001-300,000 to third network socket 640-3. In other words, the second persistent scheme may be configured to coincide with the non-overlapping virtual connection identifiers that are generated by each server instance for connectionless data streams.

First network socket 640-1 may initially be connected to server instance 410-1, and server instance 410-1 may handoff first network socket 640-1 to server instance 420-1 after a restart and initialization of server instance 420-1. Similarly, second network socket 640-2 may initially be connected to server instance 410-2, and server instance 410-2 may handoff second network socket 640-2 to server instance 420-2 after a restart and initialization of server instance 420-2; and third network socket 640-3 may initially be connected to server instance 410-3, and server instance 410-3 may handoff third network socket 640-3 to server instance 420-3 after a restart and initialization of server instance 420-3.

A similar technique may be used to scale the persistent distribution across different instances of device 110 with each device 110 running different sets of server instances. For instance, a director or load balancing appliance may receive data packets arriving at a PoP. The director may perform a round-robin distribution of initial data packets for new connectionless data streams across two or more devices 110, and may perform a persistent distribution of data packets for existing connectionless data streams across the two or more devices 110. For the persistent distribution, the director may distribute data packets with one of a first set of virtual connection identifiers to first device 110 in the PoP with server instances that identify connectionless data streams with the first set of virtual connection identifiers, and may distribute data packets with one of a different second set of virtual connection identifiers to second device 110 of PoP with server instances that identify connectionless data streams with the second set of virtual connection identifiers. Distributor 115 of each device 110 may then persistently distribute the data packets for existing connectionless data streams across the active set of server instances according to the set of connection identifiers used by those server instances.

Figure 7A:
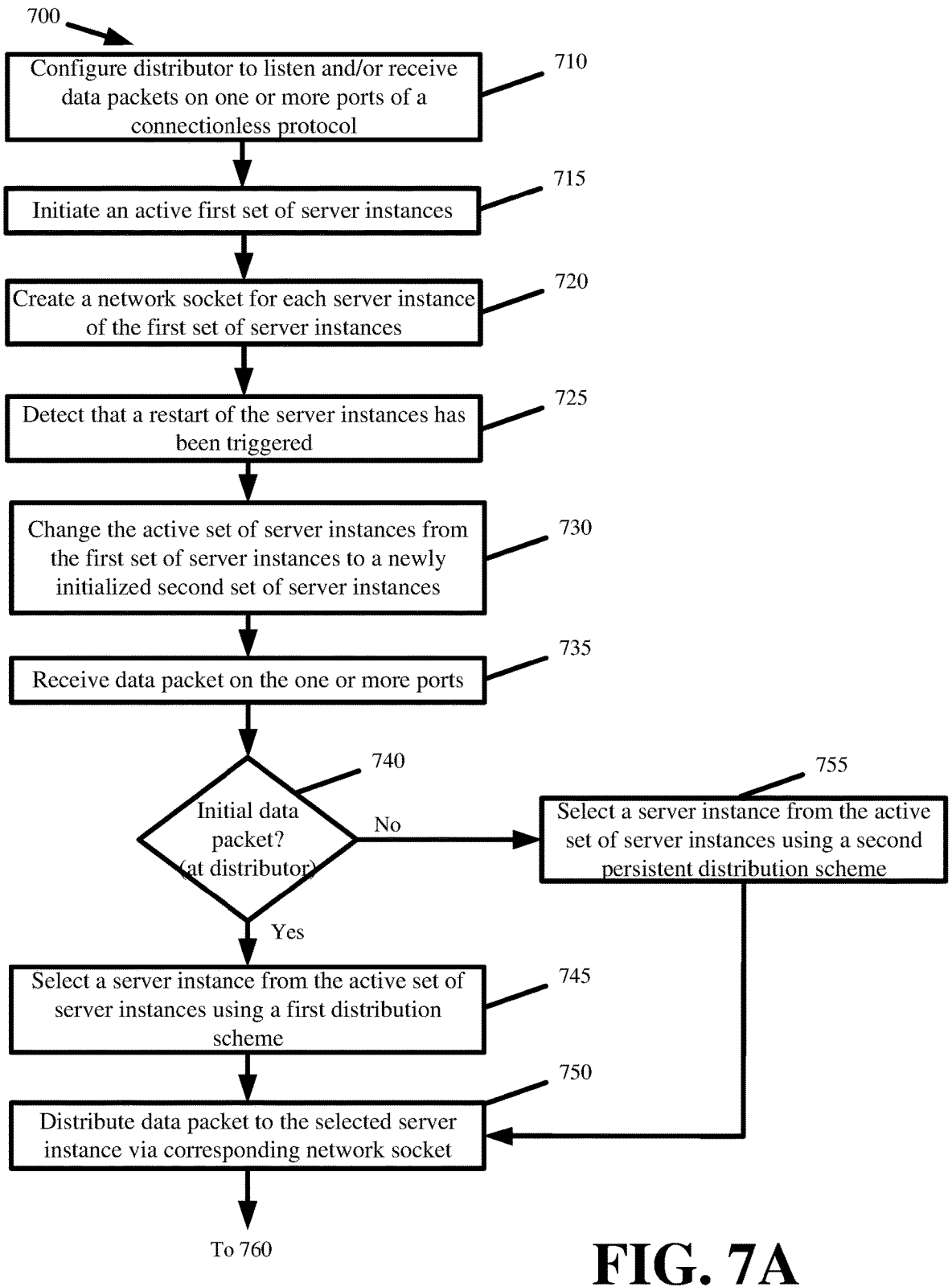
FIGS. 7A and 7B present a process for providing persistent distribution of connectionless traffic across different server instances in accordance with some embodiments described herein.
Figure 7B:
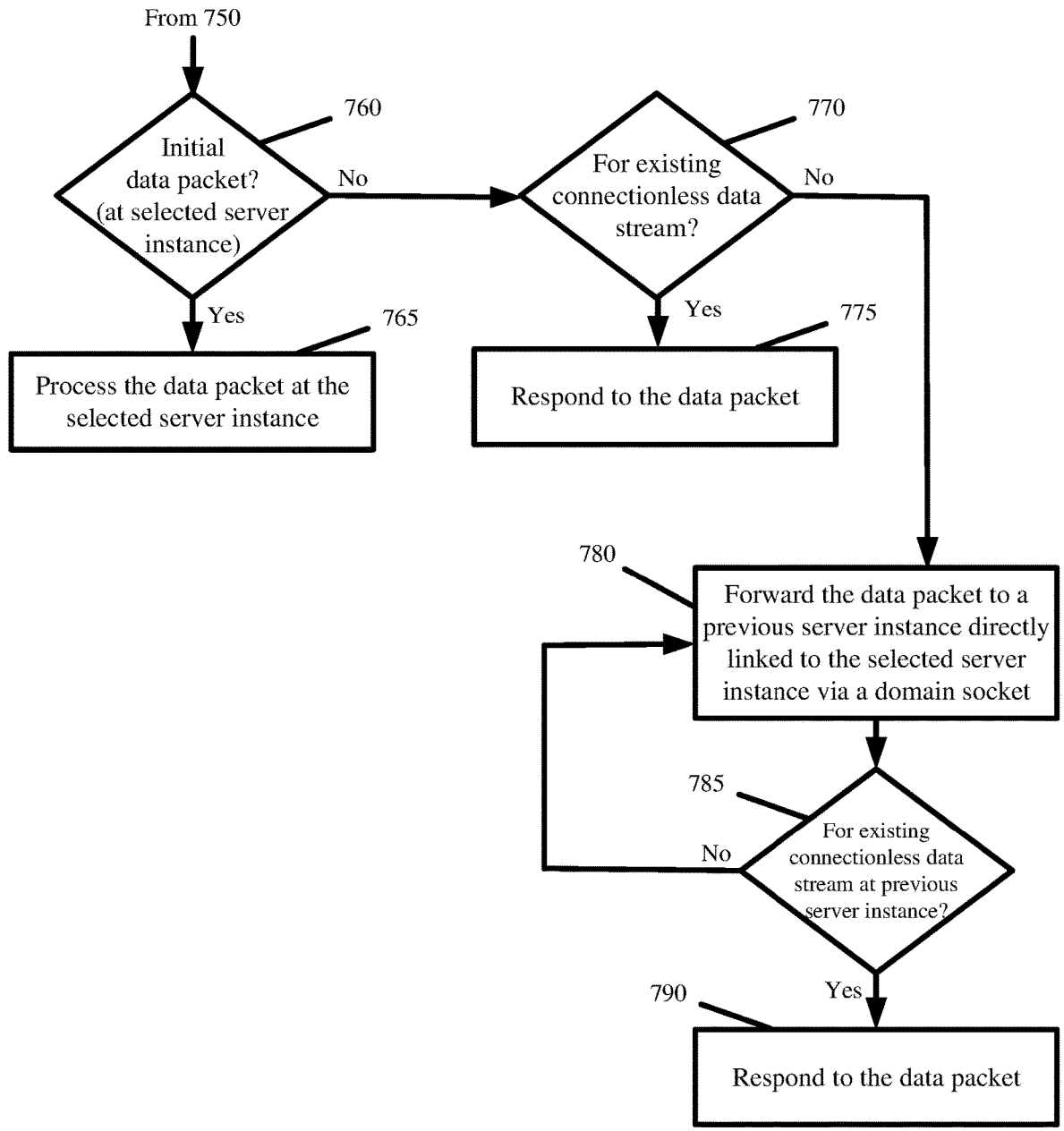

FIGS. 7A and 7B present a process 700 for providing persistent distribution of connectionless traffic across different server instances in accordance with some embodiments described herein. Process 700 may be executed by device 110.

As shown in FIG. 7A, process 700 may include configuring (at 710) distributor 115 to listen and/or receive data packets arriving on one or more ports defined for a connectionless protocol. For instance, distributor 115 may bind to port 443 in order to receive data packets that are sent via the UDP or QUIC protocols.

Process 700 may include initiating (at 715) an active first set of server instances. The first set of server instances may be separate server processes that execute in parallel, and may simultaneously and independently handle different sets of connectionless data streams. The number of server instances in the first set of server instances may correspond to the number of server instances that can run in parallel on device 110, and/or the number of hash indices that distributor 115 uses to persistently distribute connectionless traffic across the server instances. For instance, if distributor 115 is configured to distribute data packets across four server instances, then device 110 may initiate four server instances for the first set of server instances.

Process 700 may include creating (at 720) a network socket for each server instance of the first set of server instances. The network socket provides a server instance with a communication channel by which distributor 115 may distribute data packets from the network protocol stack to each of the server instances, and/or from the port of the connectionless networking protocol to each of the server instances. Accordingly, creating (at 720) a network socket may include binding one endpoint of the network socket to distributor 115 and/or the one or more ports of the connectionless network protocol (e.g., port 443).

As noted above, the server instances may restart periodically or in response to different triggering events. Accordingly, process 700 may include detecting (at 725) that a restart of the server instances has been triggered.

In response to detecting (at 725) that a restart of the server instances has been triggered, process 700 may include changing (at 730) the active set of server instances. Changing (at 730) the active set of server instances may include initiating a new second set of server instances, transferring endpoints of the created (at 720) network sockets from the first set of server instances to the second set of server instances, and establishing a set of Interprocess Communication ("IPC") channels that link each server instance of the first set of server instances to a corresponding server instance of the second set of server instances. In some embodiments, device 110 may create a domain socket between a corresponding pair of server instances. For instance, and with reference to FIG. 6 above, device 110 may create a first domain socket between server instances 410-1 and 420-1, a second domain socket between server instances 410-2 and 420-2, and a third domain socket between server instances 410-3 and 420-3. Process 700 may include multiple restarts of the server instances, and therefore different sets of server instances may be daisy-chained off the active set of server instances via multiple layers of domain sockets that connect different pairs of server instances.

Before or after restarting the server instances, process 700 may include receiving (at 735) one or more data packets on the port defined for the connectionless protocol. Accordingly, distributor 115 may receive the data packets.

Process 700 may include determining (at 740), at the distributor 115, whether each data packet is an initial data packet for a new connectionless data stream or a subsequent data packet for an existing connectionless data stream. As noted above, the determination (at 740) may be based on one or more header and/or payload properties of the data packets. For instance, the initial data packet may have a predefined type value (e.g., 0x0 or 0x7F) in the header.

In response to determining (at 740—Yes), at distributor 115, that a data packet is an initial data packet, process 700 may include selecting (at 745) a server instance in the active set of server instances to receive the initial data packet using a first distribution scheme. The first distribution scheme may select the server instance based on one or more properties of the initial data packet, or may select the server instance via a round-robin or other simplistic distribution. Process 700 may include distributing (at 750) the data packet, from distributor 115 and/or the network protocol stack of device 110, to the selected server instance via the network socket that has the selected server instance as an endpoint.

In response to determining (at 740—No), at distributor 115, that a data packet is not an initial data packet, process 700 may include selecting (at 755) a server instance in the active set of server instances to receive the subsequent data packet using a different second persistent distribution scheme. The second persistent distribution scheme selects (at 755) the server instance to receive the data packet using different header and/or payload properties of the data packet than the first distribution scheme. For instance, the second persistent distribution scheme may base the server instance selection (at 755) on the destination connection identifier specified in the data packet header, whereas the first distribution scheme may base the server instance selection (at 745) on one or more of the source address, destination address, source port, and destination port in the data packet header. Process 700 may include distributing (at 750) the data packet to the selected server instance via the network socket that has the selected server instance as an endpoint.

As shown in FIG. 7B, process 700 may include determining (at 760), at the selected server instance, whether the distributed data packet is an initial data packet for a new connectionless data packet or a subsequent data packet for an existing connectionless data packet. The determination (at 760) may be similar to the determination (at 740) performed by distributor 115, and may be based on one or more header and/or payload properties of the data packet.

In response to determining (at 760—Yes), at the selected server instance, that the distributed data packet is an initial packet for a new connectionless data stream, process 700 may include processing (at 765) the data packet at the selected server instance. Processing (at 765) the initial data packet may include establishing a virtual connection for the connectionless data stream by generating a virtual connection identifier to identify the virtual connection and/or connectionless data stream, providing the generated virtual connection identifier to the UE that submitted the initial data packet, and/or providing content, services, processing, and/or data that is requested using the initial data packet.

In response to determining (at 760—No), at the selected server instance, that the distributed data packet is not an initial data packet, but a subsequent data packet for an existing connectionless data stream, process 700 may include determining (at 770) whether the distributed data packet is for a virtual connection and/or existing connectionless data stream that the selected server instance previously responded to and/or managed. The determination (at 770) may be based on comparing the destination connection identifier in the header or payload of the distributed data packet to virtual connection identifiers that the selected server instance generated for virtual connections and/or existing connectionless data streams handled by the selected server instance.

In response to determining (at 770—Yes) that the distributed data packet is for a virtual connection established by the selected server instance, and/or an existing connectionless data stream of the selected server instance (e.g., the destination connection identifier of the distributed data packet matches a virtual connection identifier generated by the selected server instance), process 700 may include responding (at 775) to the data packet. In this case, the data packet is part of an ongoing and existing connectionless data stream. Accordingly, responding (at 775) to the data packet may include providing additional content, services, processing, and/or data in continuation of that connectionless data stream. Alternatively, if the data packet is for terminating or concluding the connectionless data stream, the server instance may terminate that connectionless data stream (e.g., release resources and/or remove state information). If the server instance has no other active connectionless data streams and there are no prior server instances linked to the current server instance, then the server instance may shutdown.

In response to determining (at 770—No) that the distributed data packet is for a virtual connection that was not established by the selected server instance (e.g., the destination connection identifier of the distributed data packet does not match to a virtual connection identifier that was previously generated by the selected server instance), process 700 may include forwarding (at 780) the data packet to a previous server instance that is directly linked to the selected server instance via a domain socket.

Process may include determining (at 785), at the previous server instance, whether the data packet is for a virtual connection established by the previous server instance. In response to determining (at 785—No), at the previous server instance, that the data packet is for a virtual connection that was not established by the previous server instance, process 700 may continue forwarding (at 780) the data packet down the daisy-chained path of server instances until the server instance that handled the virtual connection for the data packet is identified. In particular, the data packet may be forwarded (at 780) through another domain socket that connects the previous server instance to a still older server instance until the destination virtual connection identifier of the data packet matches a virtual connection identifier created by a receiving server instance. In response to determining (at 785—Yes), at the previous server instance, that the data packet is for a virtual connection that was established by the previous server instance, process 700 may include responding (at 790) to the data packet. If none of the previous server instances recognize the virtual connection identifier of the distributed data packet, then an error may be returned to the issuing UE, or the data packet may be dropped.

Based on the operation of device 110, some server instances may not have a network socket with which to directly communicate with UEs 130 via a data network. For instance, and with reference to FIG. 6, server instance 410-1 may be communicably coupled to server instance 420-1 via a domain socket, and may therefore have to pass messages to server instance 420-1 in order for server instance 420-1 to forward the messages to designated UEs 130 on behalf of server instance 410-1.

In some embodiments, an interprocess messaging protocol may be used to pass messages and/or data packets between server instances. For instance, and with reference to FIG. 6, server instance 420-1 may receive a data packet with a UDP header and a payload comprised of a QUIC packet from a network port of device 110. The UDP header information may be removed as part of receiving the data packet. When forwarding the remainder of the data packet to server instance 410-1, server instance 420-1 may encapsulate the remainder of the data packet with a wrapper that reintroduces one or more header fields from the UDP header. For instance, the added wrapper may include one or more of the source address of the UE sending the data packet, the destination address specified by the UE, and/or a timestamp that may be used for calculating the round-trip time and for congestion purposes. Similarly, when server instance 410-1 generates a response data packet to send to a UE, server instances 410-1 may encapsulate a QUIC packet with a wrapper that includes the data by which server instance 420-1 can generate the UDP header for the QUIC packet, and transmit the QUIC packet with the UDP header over the network to the intended UE.

Figure 8:
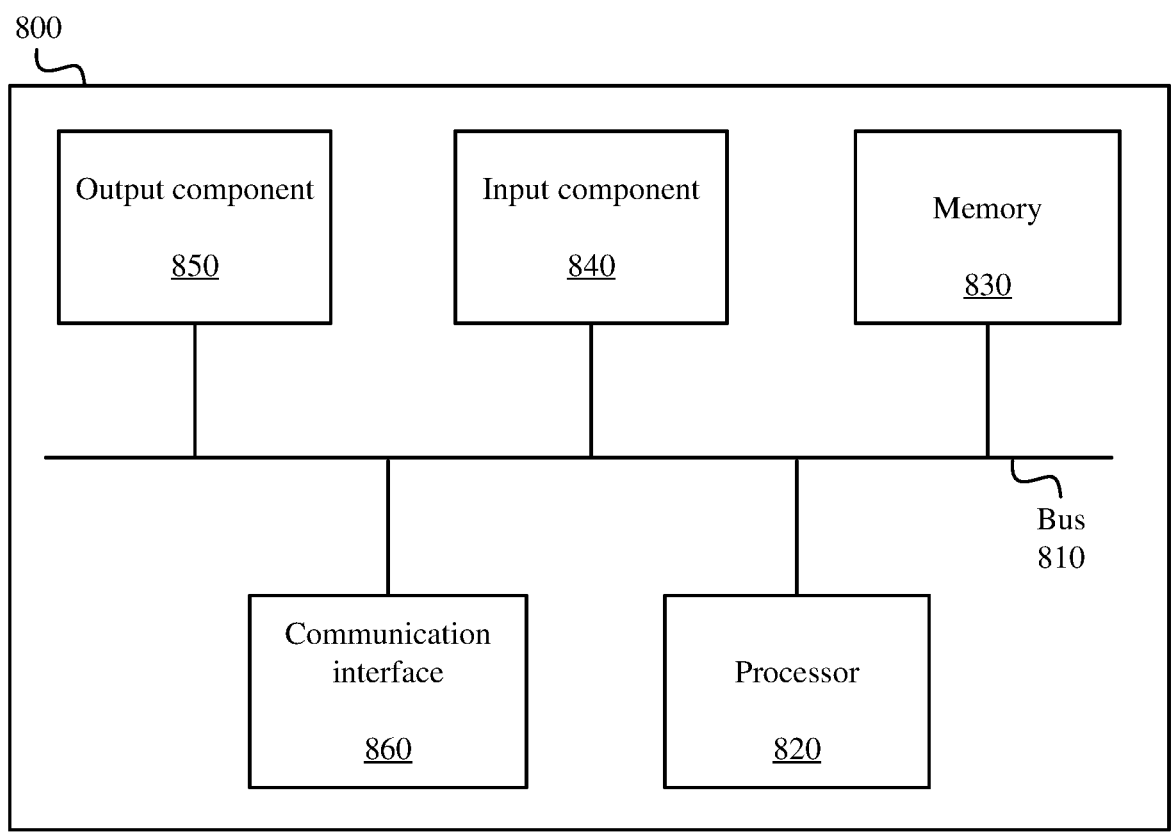
FIG. 8 is a diagram of example components of a device that is used to implement certain of the devices described above.

FIG. 8 is a diagram of example components of machine 800. Machine 800 may be used to implement certain of the devices and/or components described above (e.g., device 110, distributor 115, server instances 120, etc.) Machine 800 may include bus 810, processor 820, memory 830, input component 840, output component 850, and communication interface 860. In another implementation, machine 800 may include additional, fewer, different, or differently arranged components.

Bus 810 may include one or more communication paths that permit communication among the components of machine 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to machine 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables machine 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, machine 800 may include more than one communication interface 860. For instance, machine 800 may include an optical interface and an Ethernet interface.

Machine 800 may perform certain operations relating to one or more processes described above. Machine 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A device comprising:
a non-transitory computer-readable medium storing a set of processor-executable instructions; and
one or more processors configured to execute the set of processor-executable instructions, wherein executing the set of processor-executable instructions causes the one or more processors to:
receive a data packet at a port that is associated with a connectionless networking protocol;
distribute the data packet from the port to a first server instance running on the device;
process the data packet at the first server instance in response to the data packet comprising a connection identifier that matches to one of a first plurality of connection identifiers that the first server instance generates to identify a particular connectionless data stream that is initiated between the first server instance and a first client, and wherein the first plurality of connection identifiers comprise different connection identifiers that the first server instance generates to identify a first plurality of connectionless data streams initiated between the first server instance and different clients; and
forward the data packet from the first server instance to a different second server instance that was initiated and running on the device before the first server instance in response to the connection identifier of the data packet being different than the first plurality of connection identifiers.

2. The device of claim 1, wherein the processor-executable instructions further include processor-executable instructions to:
create a plurality of network sockets;
bind each of the plurality of network sockets to the port and to a different server instance; and
wherein the processor-executable instructions to distribute the data packet include processor-executable instructions to transfer the data packet to the first server instance using a particular network socket of the plurality of network sockets that is bound to the port and the first server instance.

3. The device of claim 2, wherein the processor-executable instructions further include processor-executable instructions to:
create a domain socket between the first server instance and the second server instance; and
wherein the processor-executable instructions to forward the data packet include processor-executable instructions to transfer the data packet from the first server instance to the second server instance using the domain socket.

4. The device of claim 1, wherein the processor-executable instructions further include processor-executable instructions to:
determine whether the data packet is an initial data packet for a new connectionless data stream based on one or more properties of the data packet; and
wherein the processor-executable instructions to distribute the data packet include processor-executable instructions to:
select the first server instance using a first distribution scheme in response to the data packet being an initial data packet for a new connectionless data stream; and
select the first server instance using a different second distribution scheme in response to the data packet being a data packet of an existing connectionless data stream of the first plurality of connectionless data streams.

5. The device of claim 4, wherein the second distribution scheme uses the connection identifier of the data packet to select the first server instance, and wherein the first distribution scheme does not use the connection identifier of the data packet to select the first server instance.

6. The device of claim 1, wherein the processor-executable instructions to process the data packet further include processor-executable instructions to:
provide a response data packet with additional data from the particular connectionless data stream.

7. The device of claim 1, wherein the processor-executable instructions further include processor-executable instructions to:
determine, at the first server instance, whether the data packet is an initial data packet for a new connectionless data stream based on one or more properties of the data packet that are different than the connection identifier of the data packet; and
initiate a new connectionless data stream at the first server instance in response to determining that the data packet is the initial data packet for the new connectionless data stream based on the one or more properties.

8. The device of claim 7, wherein the processor-executable instructions to initiate the new connectionless data stream include processor-executable instructions to:
generate a new connection identifier that is different than each of the first plurality of connection identifiers, and that is within a same first range values as the first plurality of connection identifiers; and
provide a response data packet comprising the new connection identifier in a source connection identifier field of the response data packet, and a different connection identifier, that is obtained from the source connection identifier field of the received data packet, in a destination connection identifier field of the response data packet.

9. The device of claim 1, wherein the connection identifier of the data packet is a first connection identifier in a first range of connection identifiers, and wherein the processor-executable instructions further include processor-executable instructions to:
receive a second data packet comprising a different second connection identifier that is in a different second range of connection identifiers;
distribute the second data packet from the port to a third server instance based on the second connection identifier, and the third server instance initiating a second plurality of connectionless data streams with connection identifiers in the second range of connection identifiers.

10. The device of claim 1, wherein the connectionless network protocol is based on the User Datagram Protocol ("UDP").

11. The device of claim 1, wherein the connection identifier is an identifier of the Quick Internet UDP Connections ("QUIC") protocol and is used to uniquely identify a connectionless data stream from other connectionless data streams.

12. The device of claim 1, wherein the processor-executable instructions further include processor-executable instructions to:
process, at the second server instance, the data packet in response to the data packet belonging to a connectionless data stream of a second plurality of connectionless data streams initiated with the second server instance as determined from the connection identifier matching to one of a second plurality of connection identifiers generated by the second server instance for the second plurality of connectionless data streams.

13. A method comprising:
receiving a data packet at a port that is associated with a connectionless networking protocol;
distributing the data packet from the port to a first server instance running on a device;
determining, at the first server instance, whether the data packet is an initial data packet for a new connectionless data stream based on one or more properties of the data packet that are different than a connection identifier of the data packet;
initiating a new connectionless data stream at the first server instance in response to determining that the data packet is the initial data packet for the new connectionless data stream based on the one or more properties; and
forwarding the data packet from the first server instance to a second server instance running on the device in response to the connection identifier of the data packet being different than a first plurality of connection identifiers that the first server instance generates to identify a first plurality of connectionless data streams initiated between the first server instance and different clients.

14. The method of claim 13 further comprising:
creating a plurality of network sockets;
binding each of the plurality of network sockets to the port and to a different server instance; and
wherein said distributing comprises transferring the data packet to the first server instance using a particular network socket of the plurality of network sockets that is bound to the port and the first server instance.

15. The method of claim 14 further comprising:
creating a domain socket between the first server instance and the second server instance; and
wherein said forwarding comprises transferring the data packet from the first server instance to the second server instance using the domain socket.

16. The method of claim 13, wherein said distributing comprises:
selecting the first server instance from a plurality of server instances using a first distribution scheme in response to the data packet being the initial data packet for the new connectionless data stream; and
selecting the first server instance from the plurality of server instances using a different second distribution scheme in response to the data packet being a data packet of an existing connectionless data stream.

17. The method of claim 13, wherein said initiating comprises:
generating a new connection identifier that is different than each of the first plurality of connection identifiers, and that is within a same first range values as the first plurality of connection identifiers; and
providing a response data packet comprising the new connection identifier in a source connection identifier field of the response data packet, and a different connection identifier, that is obtained from the source connection identifier field of the received data packet, in a destination connection identifier field of the response data packet.

18. The method of claim 13 further comprising:
processing, at the second server instance, the data packet in response to the connection identifier of the data packet matching to one of a second plurality of connection identifiers generated by the second server instance for a second plurality of connectionless data streams.

19. A method comprising:
receiving a first data packet at a particular port of a device, the first data packet comprising a first connection identifier that is in a first range of connection identifiers;
distributing the first data packet from the particular port to a first server instance running on the device based on the first connection identifier, and the first server instance initiating a first plurality of connectionless data streams with connection identifiers in the first range of connection identifiers;
processing the data packet at the first server instance in response to the first connection identifier matching to a particular connection identifier generated by the first server instance for one of the first plurality of connectionless data streams;
receiving a second data packet at the particular port, the second data packet comprising a different second connection identifier that is in a different second range of connection identifiers; and
distributing the second data packet from the particular port to a different second server instance running on the device based on the second connection identifier, and the second server instance initiating a second plurality of connectionless data streams with connection identifiers in the second range of connection identifiers.

* * * * *